Sept. 6, 1949.　　　C. G. SUTTON　　　2,481,256
BALANCE TESTING DEVICE
Filed Feb. 24, 1944
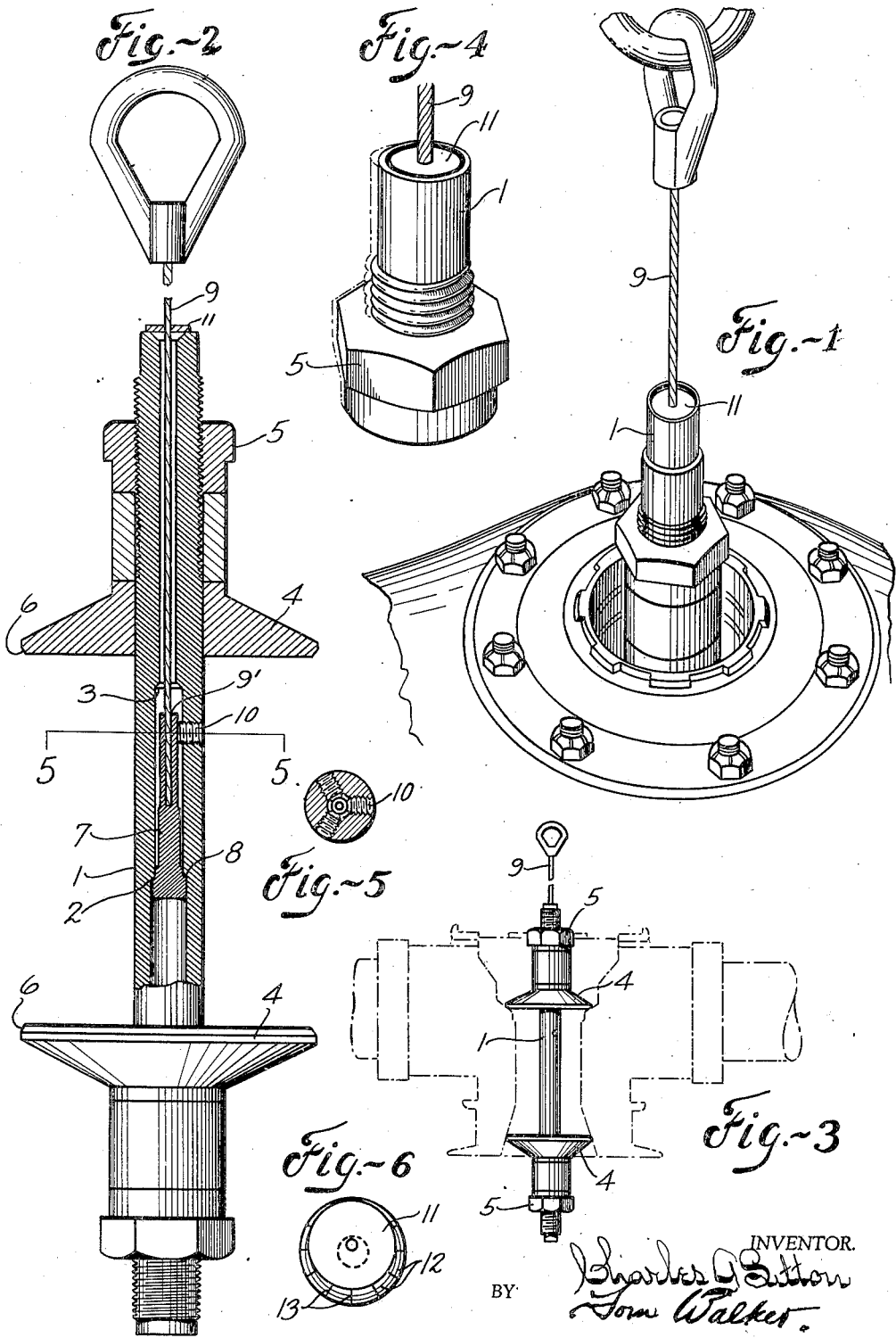
INVENTOR.
Charles G. Sutton
BY Tom Walker
ATTORNEY.

Patented Sept. 6, 1949

2,481,256

UNITED STATES PATENT OFFICE 2,481,256

BALANCE TESTING DEVICE

Charles G. Sutton, Dayton, Ohio; Charles E. Sutton, ancillary administrator of said Charles G. Sutton, deceased, assignor to Gwen Iola Sutton, Los Angeles, Calif.

Application February 24, 1944, Serial No. 523,695

14 Claims. (Cl. 73—66)

1

This invention pertains to static balance testing devices, and more particularly to a suspension type balancer for revoluble bodies adapted to automatically indicate the degree of unbalance and the relative location of the area of excessive weight.

While for illustrative purposes, but with no intent to unduly limit the scope or application of the invention, the device forming subject matter hereof is herein illustrated and described as applied to balancing of airplane propellers, for which it is especially well adapted, it is to be understood that it is not limited to such use, but is widely applicable to other revoluble bodies including vehicle wheels, automobile tires apart from the wheels, boat propellers, rotary fans, turbine runners, grinding wheels and analogous devices, wherein the condition of balance is more or less critical.

A condition of force or static unbalance in a rotating body, such as those mentioned, is a prolific source of vibration, and ordinarily occurs when the center of gravity of the body does not coincide with the center of rotation, which when the disagreement is excessive may become quite injurious and even destructive to a machine or rotating device and dangerous to persons in its vicinity.

In some instances it may be necessary to perform the testing and balancing operation, in the field or on the road in localities where shop equipment is not available. For this reason a portable balancing device of small size and light weight is desirable. The present suspension type static balancer is of such character that it may be hung on any convenient support, as the limb of a tree or the protruding end of the airplane motor shaft from which the propeller to be balanced has been removed.

The usual method is to suspend the body at its geometric center of rotation and add trial weights of putty, clay, wood, metal or any material readily at hand to the lighter area of the body and the quantity thereof gradually increased until it becomes sufficient to counteract the degree of unbalance, and bring the body to a horizontal position, in a plane to which the suspension cable is perpendicular. The trial weights are then replaced by permanent equivalent weights properly located relative to the center of the body.

The object of the present invention is to improve the construction as well as the means and mode of operation of suspension type static balancers whereby they may not only be economically manufactured, but will be efficient in use, automatic in operation, uniform in action, of compact form of light weight, having relatively few operating parts and be unlikely to get out of repair.

A further object of the invention is to provide a portable balancing device which is universally adaptable to revoluble bodies of various styles, sizes, and weights.

A further object of the invention is to provide a self contained balancing device having automatic indicating means directly incorporated therewith.

A further object is to provide in a suspension type balancer, improved means for attaching and centering the suspension cable.

A further object of the invention is to provide a balancing device which will be accurate and rapid in determining the degree and point of unbalance of a body under test.

A further object of the invention is to provide a balancing device which is adapted for usual laboratory and shop use as regular equipment but which may be successfully utilized by unskilled persons under abnormal conditions and in unconventional surroundings for emergency tests of balance of an airplane propeller, a boat propeller, a vehicle wheel or analogous device.

A further object of the invention is to provide a static balancer having the advantageous structural features, the inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is shown the preferred, but obviously not necessarily the only form of embodiment of the invention, Fig. 1 is a perspective view of the hub portion of a conventional airplane propeller suspended upon a balancing device of the instant type.

Fig. 2 is a longitudinal sectional view of an assembled balancing device in which the present invention is embodied.

Fig. 3 is a detail view illustrating the application of the present balancing device to an airplane propeller.

Fig. 4 is a detail perspective view of the balance indicating portion of the unit.

Fig. 5 is a detail sectional view on line 5—5 of Fig. 2.

Fig. 6 is an enlarged detail plan view of the upper end of the balancing unit shaft and indicator disc disposed to indicate an extreme degree of unbalance.

Like parts are indicated by similar characters of reference throughout the several views.

Briefly described, in the present invention there is contemplated a mount interchangeably adaptable to different rotary bodies to be balanced by which such body may be suspended upon a cable which thereupon becomes a vertical constant with which an unbalanced tilted position of the body may be compared, and relative to which an indicator arm affixed to the body in axial alignment with the axis of rotation thereof, is capable of wobble motion in the direction of unbalance into angular relation with the suspension cable to an extent commensurate with the degree of unbalance of the body, which movement is visually indicated by a variable member cooperating with the cable and the arm.

Referring to the drawings the present balance testing device includes a hollow shaft 1 counter bored to afford therein relatively spaced internal shoulders 2 and 3. Mounted upon the shaft 1 is a pair of concentric adapter discs 4 which are adjustable toward and from each other into concentric engaging relation with the body to be balanced. Adjusting nuts 5 screw threaded upon the shaft 1 serve to adjust the adapter discs 4 and secure them in their finally adjusted relation. In the present instance the adapter discs 4 are peripherally beveled at 6 to conform to interior concentric surfaces of a hub of an airplane propeller with which they are engageable. The size and shape of the adapters 4 may be varied in accordance with the size and contour of the body to be balanced and the size of central opening therein within which the balancing unit or mount is fixedly secured. For example, for balancing pneumatic tire casings the adapters preferably comprise spiders, the arms of which are contoured to agree with the tire rim, or with the tire beads, in event the tire is removed from the rim, which arms are engageable therewith at circumferentially spaced intervals. Whatever the size or shape of the adapters or their specific construction, they serve to position the hollow shaft 1 at the geometric center of the body to be balanced in perpendicular relation with the plane of rotation thereof. That is to say, when assembled on the propeller, wheel or tire, the shaft 1 is disposed in axial alignment with the axis of rotation of the body.

Positioned within the lower portion of the hollow shaft 1 is a spindle 7 having near its lower end a peripheral shoulder 8 for abutting engagement with the internal shoulder 2 of the bore of the shaft 1. The shoulder 8 upon the spindle and shoulder 2 within the bore of the shaft are correspondingly beveled, which affords a universal joint of quite limited range.

The spindle 7 is concentrically bored within its upper end and the end of a flexible suspension cable 9 is securely enclosed therein, which may be effected by brazing or by electric welding or similar method. The terminal of the spindle is contracted about the cable by swaging or by spinning or otherwise to assure that the cable is concentrically disposed relative to the spindle coincident with the axis thereof. The point 9' of emergence of the cable from the spindle comprises the center of oscillation or balance center about which the body tends to tilt under gravity influence when unbalanced. The degree of inclination of the body from horizontal is commensurate with the degree of unbalance. The spindle 7 with the cable 9 affixed thereto is assembled within the bore of the shaft 1 in exact concentric or axial relation thereto. To enable wobble adjustment of the spindle into such axially aligned relation with the shaft 1 the counter bore of the shaft is of somewhat greater internal diameter than the external diameter of the spindle 7. A series of set screws 10 radially disposed in the wall of the bore of the shaft 1 engage the spindle 7 therein. By loosening one screw and tightening the others, the spindle may be radially adjusted in one direction or another to position the juncture of the cable with the upper end of the spindle, i. e., the balance point 9' exactly concentric with the shaft and hence coincident with the axis of rotation of the body being tested. In such adjustment the spindle 7 is oscillated relative to its limited universal bearing 2—8, which bearing surfaces sustain the load of the body under test. The spindle is rigidly affixed in its adjusted position, and the juncture point of the cable with the spindle 7 which becomes the suspension point 9' or center of oscillation about which an unbalanced body is subject to tilting action is fixed relative to the body. The adapters are adjusted on the shaft 1 to such positions that the center of gravity of the body on test is slightly below the upper end of the spindle, and hence below the center of oscillation 9'. If the point of suspension or center of balance, i. e., the juncture point of the suspension cable 9 with the spindle 7 is positioned beneath the center of gravity of the body being tested, the latter becomes unstable. To the contrary the farther the suspension point is disposed above the center of gravity the less sensitive the device becomes, hence the most effective relationship is when the suspension point is but slightly above the center of gravity.

Inasmuch as the hollow shaft 1 is fixed in axial relation with the member being tested and is perpendicular to the plane thereof, while the weight of the suspended body keeps the cable exactly vertical, due to gravity, any unbalance of the body being tested causes its plane to tilt about the suspension point 9' and thereby incline the shaft 1 relative to the vertical suspension cable. By tilt of the plane of the body the shaft will be inclined in the direction of the area of maximum weight. The degree of unbalance will be indicated by the angle of inclination of the shaft 1 relative to the vertical suspension cable. To visually indicate the amount of deviation and hence the degree of unbalance, an indicator disk 11 is strung upon the cable, and rests on the end of the shaft. As the body being tested tilts in one direction or the other due to its unbalanced condition the indicator disc 11 remaining concentric with the cable, will assume an eccentric relation with the end of the shaft, due to movement of the latter relative to the disc. By making the disc black and polishing the end of the shaft or vice versa to afford contrast, the degree of deviation and unbalance is readily observed. The degree of unbalance may be more easily observed by comparison of the margin of the disc 11 with a series of concentric circles 12 on the end of the shaft 1. A greater or less number of which will be exposed by the shifting motion of the shaft relative to the cable and indicator disc thereon. Likewise the direction of the heavier area causing the unbalanced condition may be determined by the exposure to greater extent of radial lines 13 on the end of the shaft. The longer exposed radial line thereof indicates the direction of the heavier area.

By removing material little by little from the heavier area, or by adding weight by small increments to the lighter side, the body may be readily brought into equilibrium, when the indicator disc 11 will assume a position accurately concentric with the shaft.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A static balance testing device for symmetrical rotary bodies, including a hollow shaft, adapter means carried thereby between which the body to be balanced is engaged with the axis of rotation of the body in axial alignment with the shaft, a suspension member upon which the shaft and body are yieldingly supported extending within the hollow shaft and anchored therein in proximate relation with the center of gravity of the body and coincident with the geometrical axis of the hollow shaft relative to which the body is capable of limited tilting movement in accordance with its unbalanced condition, said hollow shaft being indicative of the degree of unbalance and the relative location of the unbalanced area of the body by its eccentric relation with the suspension member assumed by the hollow shaft incident to the unbalanced condition of the body, and a disc concentrically disposed upon the suspension member and resting upon the free end of the hollow shaft for visually indicating by its eccentricity with the shaft, the degree of unbalance of the body and relative location of the unbalanced area thereof.

2. A static balance testing device for rotary bodies, including a hollow supporting member, locating means for fixedly positioning the hollow member in axial alignment with the axis of rotation of the body above which the hollow member projects, a suspension member extending within the hollow member, means for flexibly securing the end of the suspension member coincident with the axis of rotation in approximately the plane of the suspended body, and adjusting means for varying the relation of the point of suspension member attachment to assure concentricity thereof with the hollow supporting member, the construction and arrangement being such that the tilting movement of the body incident to an unbalanced condition thereof induces angular deflection of the hollow supporting member relative to the vertical as indicated by the suspension member, the degree of which angular deflection is commensurate with the degree of unbalance of the body and the direction of which angular deflection corresponds to the direction of the unbalanced area of the body, and an indicator carried by one of said members in cooperative relation with the other of said members by which the angular deflection of the hollow supporting member relative to the suspension member and corresponding degree of unbalance and the direction thereof are visually indicated.

3. A static balance testing device, including a mount for a body to be balanced, a hollow shaft carried thereby to be fixedly positioned in perpendicular relation to the plane of the body, a suspension cable upon which the body may be suspended, a spindle positioned within the hollow shaft to the extremity of which the suspension cable is concentrically attached, a universal joint connecting the spindle and hollow shaft upon which the spindle is capable of limited wobble adjustment within the hollow shaft to position the point of attachment of the suspension cable with the spindle axially within the hollow shaft, and adjusting means for varying the spindle relative to the hollow shaft and for securing the spindle in its relatively adjusted position.

4. A static balance testing device for rotary bodies, including a suspension member upon which the body is supported, a sleeve connected with the body and extending therefrom in perpendicular relation with the plane of rotation thereof and in overlapping relation with the member, means for attaching the suspension member thereto at a point upon the axis of rotation of the body, means for laterally adjusting the point of attachment of the suspension member relative to the body and locking means for securing the point of attachment of the suspension member in its adjusted position, the construction and arrangement being such that the deflection of the sleeve relative to the suspension member when supporting the body is indicative of the degree of unbalance of the body, and the direction of deflection thereof is indicative of the direction of location of the unbalanced area of the body and an indicator carried by the suspension member in cooperating relation with the sleeve for indicating the degree and direction of relative movement of the suspension member and sleeve.

5. A static balance testing device for rotary bodies, including a hollow shaft, an internal shoulder therein in proximate relation with its lower end, a pair of relatively spaced axially adjustable adapter discs carried by the hollow shaft, means for locking the adapters in adjusted relation thereon and in engagement with a rotary body to be balanced, a spindle of less diameter than the bore of the hollow shaft, positioned therein for limited relative wobble adjustment, a peripheral shoulder upon the spindle engaging that within the bore of the hollow shaft to support the shaft and rotary body secured thereto, a suspension member extending within the hollow shaft and anchored in the extremity of the spindle, upon which the assembly is supported, a plurality of radially disposed adjusting screws in the wall of the hollow shaft radially engaging the spindle in spaced relation with the shoulder thereof by adjustment of which the position of the spindle may be varied within the hollow shaft to position the point of attachment of the suspension member accurately coincident with the axis of rotation of the body and subsequently locked in its adjusted position, the deflection of the hollow shaft relative to the suspension member incident to gravity influence upon the suspended body being indicative of the degree and direction of unbalance of the body.

6. A static balance testing device, including a mount with which a body to be balanced is engageable, a suspension cable engageable internally of the mount, an indicator carried by the mount in fixed relation with the body and extending upwardly in surrounding relation with the cable, said indicator being movable into angular relation with the cable in accordance with tilting position assumed by the body incident to unbalanced condition thereof, and a member maintained in concentric relation with the cable with which member the indicator cooperates, the relative displacement of the indicator and cooperating member being indicative of the degree of unbalance of the body and the direction of such relative displacement being indicative of the relative area of unbalance of the body.

7. A static balance testing device for rotary bodies, including a suspension member upon which the body may be suspended for tilting motion relative thereto, means for adjustably securing the suspension member to the body to be balanced, means for laterally varying the relative position of the point of attachment of the suspension member with the body to assure its location on the axis of rotation of the body, locking means for securing the attachment point of the member in its adjusted relation, and an indicating member cooperating with the suspension member to indicate relative degree and direction of unbalance in the body, said indicating member being mounted in parallel relation with the axis of rotation of the body for unison tilting motion therewith relative to the suspension member.

8. A static balance testing device wherein a rotary body to be balanced is supported upon a suspension member, including a suspension member, a hollow shaft secured to the body and projecting therefrom in axial alignment with the axis of rotation of the body within which the suspension member extends, and means secured to the suspension member and engaging and supporting the hollow shaft at a point within the bore and upon the axis thereof, the construction and arrangement being such that the point at which the suspension member engages the supporting means is substantially coincident with the plane of the body, about which point the body is capable of tilting motion under influence of gravity, the relative eccentricity of the extremity of the hollow shaft and suspension member being indicative of the degree of unbalance of the body and the relative location of the unbalanced area.

9. In a static balance testing device, wherein a rotary body to be balanced is suspended for free tilting motion under influence of gravity, a suspension member for the body, means releasably securing the suspension member to the body at a point substantially coincident with the center of gravity thereof, including a hollow shaft upon which the body is mounted, and means within the bore thereof for engaging the suspension member therewith, said shaft projecting above said body in overlapping surrounding relation with the suspension member in perpendicular relation with the plane of rotation of the body.

10. In a static balance testing device, wherein a rotary body to be balanced is suspended for free tilting motion under influence of gravity, a suspension member upon which the body is supported, and means releasably securing the suspension member to the body at a point substantially coincident with the center of gravity thereof, including a hollow shaft within which the suspension member extends which shaft projects in overlapping surrounding relation with the suspension member in perpendicular upstanding relation with the plane of rotation of the body, an internal shoulder formed within the shaft, and an attachment device for the suspension member having engagement with the internal shoulder within the hollow shaft.

11. A static balance testing device, wherein a rotary body to be balanced is suspended upon a cable for free tilting motion under influence of gravity, means securing the cable to the body coincident with the axis of rotation thereof, including a hollow shaft, an internal shoulder therein, a spindle to which the cable is attached, a peripheral head upon the spindle having engagement with the shoulder within the shaft to support the body upon the cable, the interengaging shoulders of the spindle and shaft conjointly forming a universal joint of limited range of adjustment enabling restricted wobble adjustment of the spindle within the hollow shaft to position the point of attachment of the cable with the spindle coincident with the axis of rotation of the rotary body, and means for fixedly securing the spindle in relative adjusted position of wobble motion.

12. In a balance testing device, wherein a rotary body is suspended upon a cable and is free for tilting motion under influence of gravity, an indicator projecting from the body in parallel relation with the cable when the body is in a balanced condition, and a disc concentrically positioned upon the cable and automatically variable relative to the indicator incident to tipping motion of the body to indicate the degree of unbalance thereof and the proximate position of the unbalance area.

13. In a balance testing device, wherein a rotary body is suspended upon an elongated member and is free for tilting motion relative to the member under influence of gravity, an indicator projecting from the body in parallel relation with said member when the body is in a balanced condition, and a disc concentrically positioned upon the member and automatically variable relative to the indicator incident to tipping motion of the body to indicate the degree of unbalance thereof and the proximate position of the unbalanced area.

14. A static balance testing device for symmetrical rotary bodies comprising, a hollow shaft, mounting means carried thereby between which the body to be balanced is engaged in axial alignment with the axis of the shaft, an elongated suspension element extending into the hollow shaft, means for securing the lower end of said element within the hollow shaft in concentric relationship with the shaft and in approximately the plane of the body, the suspension element and securing means being so constructed and arranged as to permit the shaft to tilt relative to the element in response to unbalance in the body, and a disc concentrically disposed upon the suspension element and movable over the top surface of the shaft to a position eccentric therewith as the shaft tilts due to unbalance of the body for visually indicating the amount and direction of the unbalanced area of the body.

CHARLES G. SUTTON.

(References on following page)

REFERENCES CITED

The following references are of record in the file of this patent:

UNITED STATES PATENTS

| Number | Name | Date |
|---|---|---|
| 728,315 | Snell | May 19, 1903 |
| 1,328,370 | Dutton | Jan. 20, 1920 |
| 1,352,905 | Machrol | Sept. 14, 1920 |
| 1,704,237 | Arms | Mar. 5, 1929 |
| 2,039,211 | Caldwell | Apr. 28, 1936 |
| 2,136,633 | Morse | Nov. 15, 1938 |
| 2,172,006 | Buckner et al. | Sept. 5, 1939 |
| 2,298,656 | Smith | Oct. 13, 1942 |
| 2,338,057 | Petersen | Dec. 28, 1943 |
| 2,436,096 | Chubb | Feb. 17, 1948 |

FOREIGN PATENTS

| Number | Country | Date |
|---|---|---|
| 114,195 | Great Britain | Mar. 21, 1918 |